Jan. 20, 1959  J. M. CHAMBERLIN ET AL  2,869,608
SPRING WHEEL
Filed Nov. 9, 1955
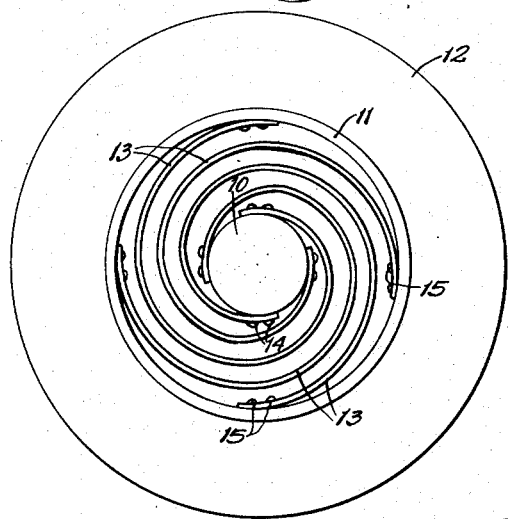
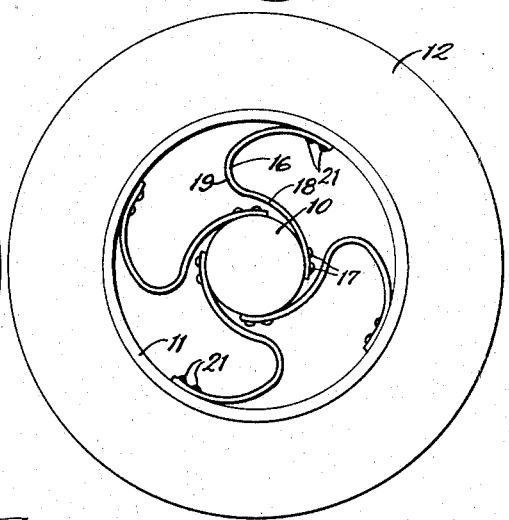
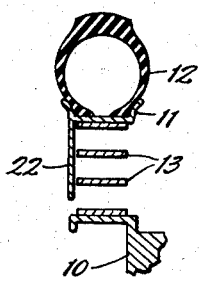
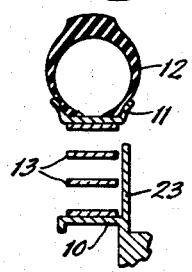
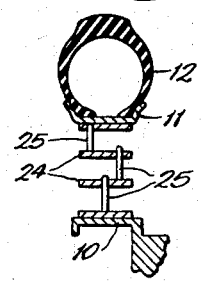
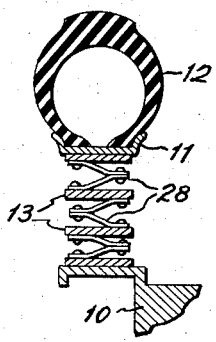
INVENTORS:
John M. Chamberlin and
BY George A. McElroy;
Owen Freeman & Molinare
ATTORNEYS.

United States Patent Office 2,869,608
Patented Jan. 20, 1959

2,869,608

SPRING WHEEL

John M. Chamberlin, Texas City, Tex., and George A. McElroy, La Grange, Ill., assignor to Palm-Roy, Inc., La Grange, Ill., a corporation of Illinois Application November 9, 1955, Serial No. 545,955

3 Claims. (Cl. 152—86)

This invention relates to spring wheels and more particularly to resilient wheels of the type adapted for use on automotive vehicles.

In automotive vehicles it has long been known that the riding characteristics and stability can be improved by minimizing the unsprung weight. Since the invention of the pneumatic tire, efforts to decrease unsprung weight have been confined largely to the design of lighter wheels and lighter suspension structures but these of necessity involve considerable mass and leave much to be desired.

Spring wheels have also been proposed in which the rim of the wheel is resiliently connected to the hub. To be satisfactory such wheels must accommodate movement of the rim relative to the hub both radially and tangentially, must transmit rotary motion efficiently between the rim and the hub and must prevent axial or tilting movement between the rim and the hub to take side thrusts.

Similar problems are encountered in wheels for other purposes such as pulleys, gears and the like where it is important to prevent transmission of shock loads or vibration.

It is one of the objects of the present invention to provide a spring wheel which satisfies all commercial requirements and which is extremely practical in use.

Another object is to provide a spring wheel in which the hub and rim are connected by a plurality of flat spring strips mounted with their width parallel to the rim axis and bent through an angle in excess of 90°.

According to one feature of the invention, the strips are rigidly secured at their ends to the rim and the hub to extend substantially tangent thereto and are curved between their ends through a total angle in excess of 180° to accommodate both radial and tangential movement. In one desirable construction, the strips are in the form of smooth spirals extending through 360°, and in another construction the strips are rebent through an angle of 180°. For increased lateral stability, the strips may be bowed at their sides to be wider at their centers than at their ends.

A further object is to provide a spring wheel in which radially extending parts are provided slidably engaging the spring strips to limit axial deflection thereof. Such parts may take the form of plates carried by the rim or the hub or both and engaging the edges of the strips or of radial projections on the strips themselves extending slidably through openings in the adjacent strips.

The above and other objects and features of the invention will be more readily apparent from the following description when read in connection with the accompanying drawing, in which:

Figure 1 is an elevation of a spring wheel embodying the invention.

Figure 2 is a view similar to Figure 1 of an alternative construction;

Figures 3, 4, 5 and 6 are partial radial sections illustrating different means for imparting lateral stability; and Figure 7 is a developed view of one of the spring strips.

The wheel shown in Figure 1 comprises a central hub 10 which may be supported in any desired manner on an axle or the like and which in turn is adapted to support the vehicle wheel. An annular rim 11 is mounted concentrically with the hub 10 and may carry a conventional pneumatic tire as shown at 12, although any other desired type of tire could be employed, depending upon the service for which the wheel is intended. According to the present invention, the hub and rim are resiliently connected for relative radial and tangential movement so that road shocks to which the tire and rim are subjected will be cushioned. In this construction, therefore, the rim and tire constitute the only unsprung weight so that road shocks are absorbed very close to the point of origin without being transmitted in appreciable amplitude through the hub to the vehicle itself. It will be understood that the hub may be connected to the vehicle through the usual spring suspension system which will absorb heavier shocks. The overall result is an extremely smooth ride and a high degree of stability.

As shown in Figure 1, the hub and rim are resiliently connected by a plurality of flat spring strips mounted with their width extending axially of the wheel and rigidly secured at their opposite ends to the hub and the rim. Four such strips 13 are shown, although any desired number greater or less than four could be employed. Each strip is secured rigidly at its inner end to the hub by fastenings illustrated at 14 and extends tangentially from the hub in the form of a smooth spiral. Each strip extends throughout a complete 360° with its outer end lying substantially tangent to the inner surface of the rim 11 and rigidly secured thereto by fastenings 15. Preferably, the strips are preformed into spiral shape of slightly greater or less radius than the rim and are slightly compressed or stretched radially in mounting the rim so that the static load on the wheel will be carried with less deflection between the rim and hub.

With the strips constructed and mounted as shown, the outer ends of the strips can deflect both radially and tangentially and will resist radial and tangential movements with substantially equal force. Thus, as the wheel tends to move upward relative to the hub as seen in Figure 1, the lowermost strip 13 will be compressed radially, the uppermost strip will be extended radially and the two side strips will deflect tangentially with each of the strips exerting substantially the same force to maintain the wheel in balance and to distribute the load uniformly between the rim and the hub. Due to the fact that the strips are relatively wide compared to their thickness, they will strongly resist any axial deflection so that the rim will be maintained in the plane of the hub and will resist tilting to minimize side sway.

Figure 2 illustrates an alternative construction which is identical to Figure 1 except for the configuration of the spring strips. As shown in Figure 2, four strips 16 are employed, each of which is rigidly secured to the hub at 17 and extends substantially tangent thereto. The strips are curved smoothly around the hub as shown at 18 and are then rebent at 19 through approximately 180° so that their outer ends lie tangent to the inner surface of the rim 11 and are rigidly secured thereto at 21. The total angle through which the strips 16 are bent is in excess of 180° and approximates 270° so that the outer ends of the strips can deflect both radially and tangentially and will resist deflection in both directions with approximately the same degree of force. The strips 16 may be prestressed in the same manner as the strips 13 to carry the initial static load if desired. The strips 16 are also mounted with their width parallel to the wheel axis so that they will strongly resist axial deflection.

Figures 3, 4, 5 and 6 illustrate alternative methods of further bracing the wheel structure against axial deflection in response to side loads. As shown in Figure 3, the rim 11 is formed with a side plate 22 overlying the edges of the spring strips 13 and slidably fitting thereagainst. The plate 22 is preferably an annular plate whose radial width is less than the normal spacing between the rim 11 and the hub 10 so that the rim and hub can move radially relative to each other without any interference due to the side plate. Axial loads on the wheel will cause the side plate to bear against the edges of the spring strips and will limit axial deflection of the strips to provide greater strength and rigidity in the axial direction without interfering with free radial movement between the rim and the hub.

In the alternative construction of Figure 4, the hub carries an annular side plate 23 overlying the edges of the spring strips 13 and terminating short of the rim 11. This plate functions in the same manner as the plate 22 of Figure 3 to limit axial deflection of the strips without interfering with free radial deflection thereof to provide additional strength and rigidity against side loads on the wheel. It will be apparent that both plates could be employed if desired to provide an extremely high degree of rigidity.

Figure 5 illustrates still another construction in which spring strips 24 which might be formed spirally as shown in Figure 1 or rebent as shown in Figure 2 lie between the hub 10 and the rim 11. Each strip carries one or more radially extending projections 25 in the form of pins or short radial flanges with each projection 25 extending slidably through an opening or slot in the adjacent spring strip. As the strips deflect radially, the projections 25 will slide through the openings in the adjacent strips but will engage the sides of the openings to prevent any relative axial movement between the strips. The openings, as will be understood, are elongated circumferentially of the strips so that relative circumferential movement can be accommodated by circumferential sliding of the projections 25 in the openings. In this way the wheel is braced axially to be extremely rigid in the axial direction while being freely movable radially.

As shown in Figure 6, adjacent portions of spring strips 13 which might be spiral, as in Figure 1, or rebent as in Figure 2, are connected by generally U-shaped spring clips 28. Each clip is formed of two short spring strips riveted or welded together at one end and having their opposite ends riveted or welded to the spring strips 13 respectively. Such spring clips will flex freely radially but will strongly resist any relative axial movement of the strips 13.

According to a further feature of the invention, as illustrated in Figure 7, the several spring strips may be bowed outward at their sides to be wider at their centers than at their end portions. As there shown, a strip 26 in the form of a flat piece of spring stock is shaped with convexly curved sides to have a wide central portion and relatively narrow ends formed with openings 27 therein to receive mounting fastenings. When the strip is bent into a spiral, as shown in Figure 1, or into a reverse bend as shown in Figure 2, and has its end portions rigidly secured to the hub and rim respectively, it possesses a very high degree of strength against lateral bending but can flex radially and tangentially. It will be understood that all or any of the spring strips shown in Figures 1 to 6 could be shaped as illustrated in Figure 7 to increase the axial strength.

In utilizing the spring wheel of the present invention on passenger automobiles, for example, the wheel is so constructed that the rim and hub may have a maximum relative radial movement on the order of 1½ to 2", which is sufficient to absorb most relatively minor road shocks. The vehicle can therefore be provided with a relatively stiff normal suspension system to give it a high degree of road stability while maintaining a relatively soft ride characteristic. The normal suspension system, when used with a spring wheel according to the present invention, is called upon to absorb only major road shocks which would deflect the spring wheel beyond its limits of movement and can therefore be substantially simplified and stiffened. The overall result is that a very smooth ride is produced due to the extremely low unsprung weight and increased road stability is provided due to the fact that the normal suspension system may be made quite stiff.

While several embodiments of the invention have been shown and described in detail, it will be understood that these are illustrative only and are not to be taken as a definition of the scope of the invention, reference being had for this purpose to the appended claims.

What is claimed is:

1. A spring wheel comprising a hub, an annular rim concentric with and spaced from the hub, and a plurality of spring elements connecting the hub and the rim, each of the spring elements including a flat strip of spring material mounted with its width parallel to the axis of the hub and rim, one end of the strip being rigidly secured to the hub and extending tangentially therefrom and the other end of the strip lying flat against the inner surface of the rim and being rigidly secured thereto, the strip between its ends being bent through a total angle exceeding 90°, each of the spring strips having at least one radially extending guide thereon intermediate its ends and having at least one opening therein intermediate its ends slidably receiving a guide on an adjacent strip to limit relative axial movement of the strips.

2. A spring wheel comprising a hub, an annular rim concentric with and spaced from the hub, and a plurality of spring elements connecting the hub and the rim, each of the spring elements including a flat strip of spring material mounted with its width parallel to the axis of the hub and rim, one end of the strip being rigidly secured to the hub and extending tangentially therefrom and the other end of the strip lying flat against the inner surface of the rim and being rigidly secured thereto, the strip between its ends being bent through a total angle exceeding 90°, and a plurality of generally U-shaped spring clips between adjacent portions of the spring strips with the legs of the U extending axially and secured respectively to the adjacent portions of the strips.

3. A spring wheel comprising a hub, an annular rim concentric with and spaced from the hub, a plurality of spring elements connecting the hub and rim, each of the spring elements including a flat strip of spring material mounted with its width parallel to the axis of the hub and rim, one end of the strip being rigidly secured to the hub and the other end of the strip lying flat against the inner surface of the rim and being rigidly secured thereto, the strip between its end being bent through a total angle exceeding 90° and the strips providing adjacent radially spaced portions between the hub and the rim, and radially movable means carried by and connecting the adjacent radially spaced portions of the strips intermediate the ends of the strips to limit relative axial movement thereof.

References Cited in the file of this patent

UNITED STATES PATENTS

| Number | Name | Date |
|---|---|---|
| 578,472 | Southworth | Mar. 9, 1877 |
| 1,043,828 | Hayden | Nov. 12, 1912 |
| 1,059,026 | Bulmer | Apr. 15, 1913 |
| 1,096,749 | Pinguely | May 12, 1914 |
| 1,167,757 | Hess | Jan. 11, 1916 |
| 1,286,761 | Payne | Dec. 3, 1918 |
| 1,411,665 | Kirchner | Apr. 4, 1922 |
| 1,489,231 | Beisel | Apr. 8, 1924 |
| 1,599,599 | Van Mohr | Sept. 14, 1926 |